(12) United States Patent
Hiscock (10) Patent No.: US 10,740,068 B2
(45) Date of Patent: Aug. 11, 2020

(54) MODULAR REDUCTION DEVICE

(71) Applicant: COMMISSARIAT A L'ENERGIE ATOMIQUE ET AUX ENERGIES ALTERNATIVES, Paris (FR)

(72) Inventor: Thomas Hiscock, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/121,775

(22) Filed: Sep. 5, 2018

(65) Prior Publication Data

US 2019/0073196 A1 Mar. 7, 2019

(30) Foreign Application Priority Data

Sep. 5, 2017 (FR) ...................... 17 58179

(51) Int. Cl.
| | |
|---|---|
| *G06F 7/72* | (2006.01) |
| *H04L 9/30* | (2006.01) |
| *G06F 7/38* | (2006.01) |
| *G06F 12/0895* | (2016.01) |
| *G06F 12/14* | (2006.01) |
| *G11C 7/10* | (2006.01) |
| *G09C 1/00* | (2006.01) |

(52) U.S. Cl.
CPC ............ *G06F 7/72* (2013.01); *G06F 7/38* (2013.01); *G06F 12/0895* (2013.01); *G06F 12/1408* (2013.01); *G09C 1/00* (2013.01); *G11C 7/1006* (2013.01); *H04L 9/302* (2013.01); *H04L 9/3013* (2013.01); *H04L 2209/122* (2013.01)

(58) Field of Classification Search
CPC ........... G06F 7/72–729; G06F 12/0893; G06F 12/0895; G06F 12/0897; H04L 9/06; G11C 1/10; G11C 1/1006
See application file for complete search history.

(56) References Cited

U.S. PATENT DOCUMENTS

| | | | |
|---|---|---|---|
| 2007/0297601 A1 | 12/2007 | Hasenplaugh et al. | |
| 2008/0109501 A1* | 5/2008 | Douguet | G06F 7/722 708/250 |
| 2011/0013768 A1* | 1/2011 | Lambert | G06F 7/728 380/28 |
| 2018/0181391 A1* | 6/2018 | Gopal | G06F 7/728 |
| 2018/0288069 A1* | 10/2018 | Burchard | H04L 63/126 |

OTHER PUBLICATIONS

M. Will et al., Computing Mod Without Mod, Cryptology ePrint Archive, Report 2014/755, 2014 (Year: 2014).*

(Continued)

*Primary Examiner* — Andrew Caldwell
*Assistant Examiner* — Emily E Larocque
(74) *Attorney, Agent, or Firm* — Oblon, McClelland, Maier & Neustadt, L.L.P.

(57) ABSTRACT

A modular reduction device particularly for cryptography on elliptical curves. The device includes a Barrett modular reduction circuit and a cache memory in which the results of some precalculations are carried out. When the result is not present in the cache memory, a binary division circuit makes the precalculation and stores the result in the cache memory.

12 Claims, 8 Drawing Sheets

(56) References Cited

OTHER PUBLICATIONS

Laszlo Hars, Applications of Fast Truncated Multiplication in Crytography, Research Article, EURASIP Journal on Embedded Systems, vol. 2007, ID 61721, 2006 (Year: 2006).*
C. Hoon Lim, et al., Fast Modular Reduction with Precomputation, CiteSeer Scientific Literature Digital Library, 1999 (Year: 1999).*
A. Bosselaers, et al., Comparison of three modular reduction functions, Advances in Cryptology, Crypto'93, 1994 (Year: 1994).*
P. Giorgi et al., Multiparte Modular Multiplication, RR-11024, 2011 (Year: 2011).*
U.S. Appl. No. 15/412,252, filed Jan. 23, 2017, US-2017-0214523-A1, Florian Pebay-Peyroula, et al.
U.S. Appl. No. 15/440,157, filed Feb. 23, 2017, US-2017-0244553-A1, Oliver Savry, et al.
French Preliminary Search Report dated May 15, 2018 in French Application 17 58179 filed on Sep. 5, 2017 (with English Translation of Categories of Cited Documents).
Vinodh Gopal, et al., "Fast and Constant-Time Implementation of Modular Exponentiation," $28^{th}$ International Symposium on Reliable Distributed Systems, Jan. 2009, 8 Pages.
Miroslav Knezevic, et al., "Speeding Up Barrett and Montgomery Modular Multiplications," 11 Pages.
Deschamps, "Barrett Reduction Algorithm" Hardware Implementation of Finite-Field Arithmetic, Chapter Two, 2009, pp. 43-48.

\* cited by examiner

Fig. 1

BACKGROUND ART

Fig. 8

MODULAR REDUCTION DEVICE

TECHNICAL DOMAIN

This invention relates to modular reduction devices. Its applications lie particularly in the field of cryptography, and particularly asymmetric key infrastructures such as RSA or El Gamal, and encryption based on elliptical curves or on Euclidean networks

STATE OF PRIOR ART

The modular reduction of an integer $x \in \mathbf{Z}$ by a divider $q \in \mathbf{Z}^*$, also called modulo, is defined as being the remainder of the Euclidean division of x by this modulo. Most encryption and error correction coding methods make direct or indirect use of arithmetic operations on a finite ring $\mathbf{Z}_q = \mathbf{Z}/q\mathbf{Z}$ in which q, non-null positive integer, is the characteristic of the ring, this finite ring being a finite field if q is a prime number. Arithmetic operations on finite rings or fields require modular reduction operations. However, naive Euclidean division methods are not suitable for the processing of large numbers used in cryptography (for example 256 bits). A large amount of research has also been performed on modular reduction algorithms.

A first approach consists of determining successive digits of the quotient by recurrence (manual division method), division with or without state restoration, or even more advanced versions such as the SRT (Sweeney, Robertson, Tocher) method. These algorithms are very generic, but have relatively high latency and are not suitable for calculations on large numbers. Furthermore, SRT type fast division methods require relatively large circuits.

A second approach consists of using only special forms of moduli (for example Mersenne numbers), for which very efficient algorithms are known.

A third approach consists of developing generic algorithms based on preliminary calculations that are frequently expensive but that then make it possible to perform a fast calculation of the modular remainder. These algorithms include particularly Montgomery's method, Barrett's method and Barrett's generalised method.

A presentation of Montgomery's method and Barrett's generalised method is given in the paper by M. Knežević et al. entitled "Speeding up Barrett and Montgomery modular multiplications" published in 2009.

Barrett's generalised method is summarised below. It makes use of two reduction parameters $\alpha \in \mathbf{Z}$, $\beta \in \mathbf{Z}$ satisfying conditions specified below. The reduction in x modulo q, denoted x mod q is defined by the remainder of the r Euclidean division of x by q, namely:

$$r = x - q\lfloor x/q \rfloor \quad (1)$$

in which $0 \leq r < q$ and $\lfloor x/q \rfloor$ is the quotient defined as being the integer part of x/q, in other words the largest integer less than or equal to x/q.

The basic idea of Barrett's method is to make an estimate of $\lfloor x/q \rfloor$ by smaller values, observing that:

$$\lfloor x/q \rfloor = \left\lfloor \frac{\frac{x}{2^{\alpha+\beta}} \frac{2^{n+\alpha}}{q}}{2^{\alpha-\beta}} \right\rfloor \quad (2)$$

the estimate by lower values then being given by the integer:

$$k = \left\lfloor \frac{\mu \left\lfloor \frac{x}{2^{\alpha+\beta}} \right\rfloor}{2^{\alpha-\beta}} \right\rfloor \quad (3)$$

in which $$\mu = \left\lfloor \frac{2^{n+\alpha}}{q} \right\rfloor$$

is a constant that can be precalculated from q. The integer k is a very good approximation of $\lfloor x/q \rfloor$ being given that it can be demonstrated that if $\alpha \geq n+1$ and $\beta \leq -2$ we obtain:

$$k \leq \lfloor x/q \rfloor \leq k+1 \quad (4)$$

in other words $\lfloor x/q \rfloor = k$ or $\lfloor x/q \rfloor = k+1$.

Obviously, powers of 2 appearing in expression (3) are suitable for the calculation on binary values. If we use y>>n to denote the shift of n bits towards the right, the Barrett generalised algorithm can be represented by the following pseudo-code:

$q \in \mathbf{Z}^*, q < 2^n, 0 \leq x < 2^{2n}, \alpha \geq n+1, \beta \leq -2$ 1. $\mu \leftarrow \left\lfloor \frac{2^{n+\alpha}}{q} \right\rfloor$      precalculation of $\mu$
2. $t \leftarrow x \gg (n+\beta)$
3. $k \leftarrow (t\mu) \gg (\alpha - \beta)$
4. $r' = x - kq$
5. if $r' > q$ then
6. $r' \leftarrow r' - q$
7. end if
8. return $r'$ It will be noted that the constraint on the size of the input x, on not more than 2n bits, makes a modular multiplication possible (on the ring $\mathbf{Z}_q$ in which q is an integer of n bits), in other words to calculate the product z=xy with $x,y \in \mathbf{Z}_q$. The values x,y being represented on n bits, z is represented on 2n bits and a modular reduction can be made on it using the above algorithm.

Figure 1:
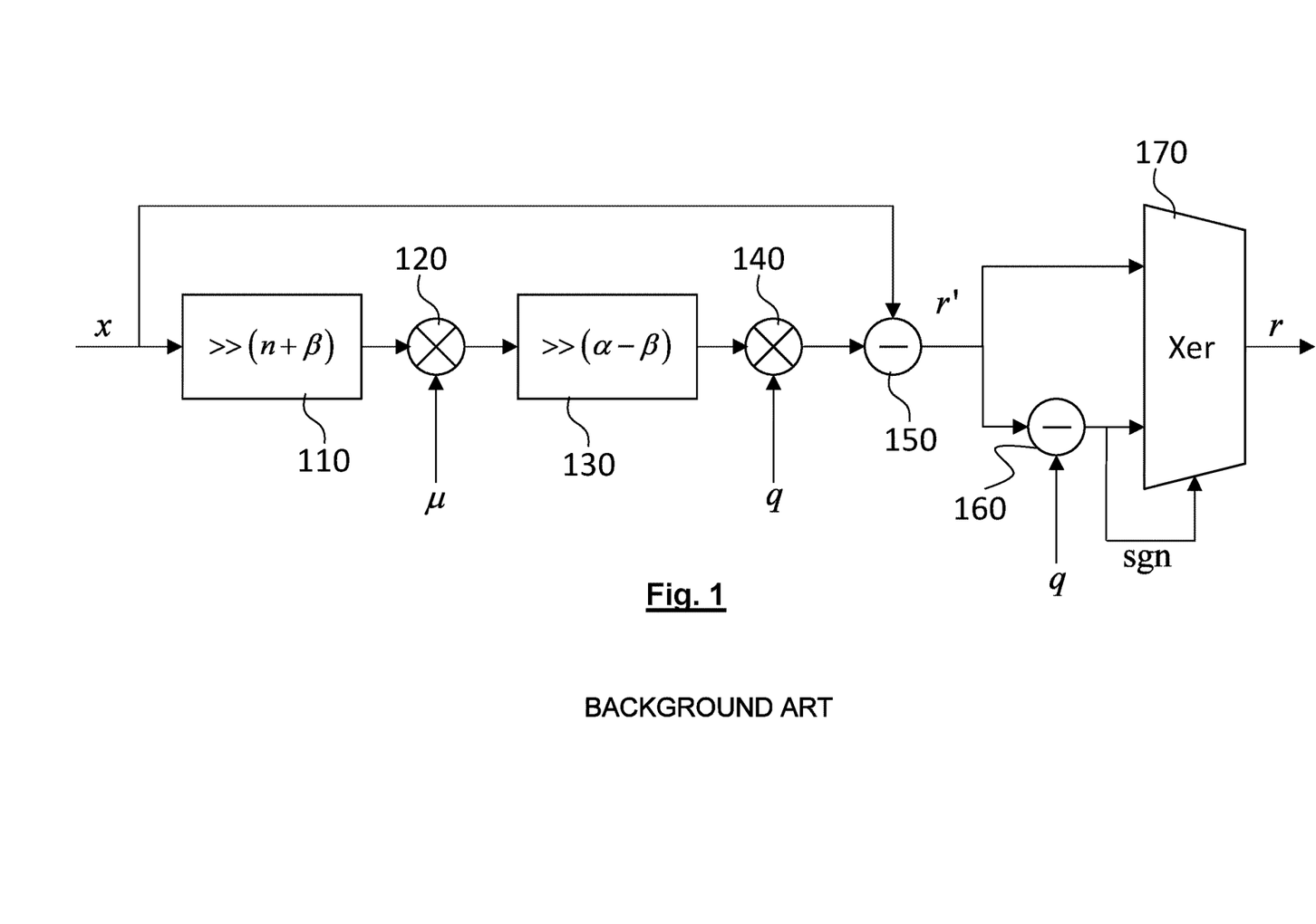
FIG. 1, described above, diagrammatically describes a modular reduction circuit implementing the generalised Barrett algorithm known in the state of the art.

FIG. 1 diagrammatically represents a circuit implementing the Barrett generalised algorithm.

The value x on which the modular reduction is to be made is represented by a word with 2n bits. This word is input to a first shift circuit 110 in which it is shifted to the right by (n+β) bits corresponding to a division by $2^{n+\beta}$. Such a shift is advantageously made by extracting only the n−β high order bits of the input. The word thus shifted is then multiplied in 120 by the precalculated factor μ.

The result of the multiplication is input to a second shift circuit in which it is shifted by (α−β) bits to the right in 130 to obtain an estimate k of the quotient.

This estimate of the quotient is multiplied in 140 by the divider q and the result obtained is subtracted from the value x in 150 to give a provisional estimate r' of r. The divider q is then subtracted from r' in 160.

A multiplexer 170 selects the value r' at the output from the subtractor 150 or the value r'−q at the output from the subtractor 160 depending on the sign of r'−q. This, the multiplexer 170 provides the result of the modular reduction r as r'−q if r'−q is positive and as r' if r'−q is negative or zero.

Barrett's generalised method can be used to efficiently perform a modular reduction. However, it requires a preliminary calculation of the value $$\mu = \left\lfloor \frac{2^{n+\alpha}}{q} \right\rfloor,$$

that significantly increases the latency of the circuit.

Consequently, the purpose of this invention is to disclose a modular calculation device that is efficient and that has less latency than that observed in the state of the art.

PRESENTATION OF THE INVENTION

This invention is defined by a modular reduction device to calculate the remainder of an integer x divided by a modulo q, said integer being represented by a binary word of 2n bits and the modulo by a binary word of n bits, and comprises a circuit implementing a generalised Barrett reduction algorithm, called a Barrett circuit, a cache memory and a binary division circuit, the Barrett circuit receiving said integer and a result of a precalculation ($\mu$) relative to a value of the modulo (q) and a power of 2 ($2^{n+\alpha}$), the result of the precalculation being supplied directly by the cache memory to the Barrett circuit if it is already stored relative to said modulo value, and otherwise being calculated by the binary division circuit before being stored in the cache memory and input to the Barrett circuit.

In a first embodiment, the cache memory comprises a first part called the tag memory, and a second part called the data memory, the first and second parts being addressed by $f(q)$ in which $f$ is a projection function of n bits on m bits with m<n, the first part storing the tag value q' that was used to calculate $f(q')$ at address $f(q')$, and the second part storing said precalculation result ($\mu(q')$) at the same address $f(q')$.

The binary division circuit is adapted to perform the precalculation $$\mu = \left\lfloor \frac{2^{n+\alpha}}{q} \right\rfloor$$

in which $$\left\lfloor \frac{2^{n+\alpha}}{q} \right\rfloor$$

is the largest integer smaller than or equal to $$\frac{2^{n+\alpha}}{q}$$

in which $2^{n+\alpha}$ is said power of 2 and $\alpha$ is an integer such that $\alpha \geq n+1$.

In this first embodiment, the Barrett circuit shifts the binary word representing x by $\alpha+\beta$ bits towards the low order bits, in which $\beta$ is an integer such that $\beta \geq -2$, then multiplies the word thus shifted by the result of this precalculation, $\mu$, then shifts the result of this multiplication again by $\alpha-\beta$ bits towards the low order bits to obtain a second word, said second word being multiplied by the modulo before being subtracted from the binary word representing x to supply a provisional value r' of the remainder, the value of the remainder r being chosen equal to r' if r'−q is negative or zero and equal to r'−q if r'−q is positive.

In a second embodiment, the cache memory also receives the integer x and also provides the result of the precalculation for a value of the modulo q, a sign value associated with the (x,q) pair, this sign value being input to the Barrett circuit.

The cache memory advantageously comprises a first part called the tag memory, and a second part called the data memory, the first and second parts being addressed by g(x,q) in which g is a projection function of 3n bits on m bits with m<3n, the tag memory storing a tag value (x',q') that was used to calculate g(x',q') at address g(x',q') and the data memory storing said precalculation result ($\mu(q')$) and said sign value (b(x',q')) associated with the tag (x',q'), at the same address g(x',q').

The result of the precalculation and the sign value are then supplied directly by the cache memory to the Barrett circuit if the (x,q) pair is stored in the tag memory, and otherwise the result of the precalculation, $\mu$, is obtained by the binary division circuit from the value of the modulo, q, and the power of 2, the sign value, b, being obtained from the value of the modulo, q, the integer, x, and the precalculation result, the precalculation result and the sign value being stored in the data memory at the address to be calculated g(x,q) before being input to the Barrett circuit.

According to a first and a second variant of the second embodiment, the modular reduction device comprises a second cache memory receiving the integer x and the modulo q and outputting a sign value b stored at an address in relation to the (x,q) pair, this sign value being input to the Barrett circuit.

According to said first variant, the second cache memory comprises a second tag memory and a second data memory, these second tag and data memories both being addressed by h(x,q) in which h is a projection function of 3n bits on m bits in which m<3n, the second tag memory storing a tag value (x',q') used to calculate h(x',q') at address h(x',q'), and the second data memory storing said sign value (b(x',q')) associated with the tag (x',q'), at the same address h(x',q').

The sign value is then provided directly by the second cache memory to the Barrett circuit if the modulo value q is stored in the tag memory and the (x,q) pair is stored in the second tag memory, and otherwise the sign value, b, is obtained from the modulo value, q, and the integer, x, the sign value then being input to the Barrett circuit.

According to said second variant, the second cache memory comprises a second data memory but does not comprise a tag memory, a comparator to verify if the output r from the Barrett circuit satisfies the condition 0≤r<q and that the sign value thus obtained (b(x,q)) stored in the second data memory at address h(x,q) in relation to the (x,q) pair, in which h is a projection function of 3n bits on m bits in which m<3n, is inverted if said condition is not satisfied.

In the second embodiment as in the first, the binary division circuit performs the precalculation $$\mu = \left\lfloor \frac{2^{n+\alpha}}{q} \right\rfloor$$

in which $$\left\lfloor \frac{2^{n+\alpha}}{q} \right\rfloor$$

is the largest integer smaller than or equal to $$\frac{2^{n+\alpha}}{q}$$

in which $2^{n+\alpha}$ is said power of 2 and $\alpha$ is an integer such that $\alpha \geq n+1$.

According to the second embodiment, the Barrett circuit shifts the binary word representing x by $\alpha+\beta$ bits towards the low order bits, in which $\beta$ is an integer such that $\beta \geq -2$, then multiplies the word thus shifted by the precalculation result, $\mu$, then shifts the result of this multiplication by another $\alpha-\beta$ bits towards the low order bits to obtain a second word, the sign value being subtracted from the second word before it is multiplied by the modulo, the result of this multiplication then being subtracted from the integer x to give said remainder, r.

BRIEF DESCRIPTION OF THE DRAWINGS

Other features and advantages of the invention will become clear after reading a preferred embodiment of the invention, given with reference to the appended figures among which.

DETAILED PRESENTATION OF PARTICULAR EMBODIMENTS

The basic concept of the invention is to combine a modular reduction circuit implementing a Barrett algorithm with a cache memory and a binary division circuit, as described in detail below. The introduction of a cache memory can avoid the repetition of previously made pre-calculations of values of $\mu$, these precalculations being handled by the binary division circuit in the case in which the values of $\mu$ do not appear in the cache memory.

Figure 2:
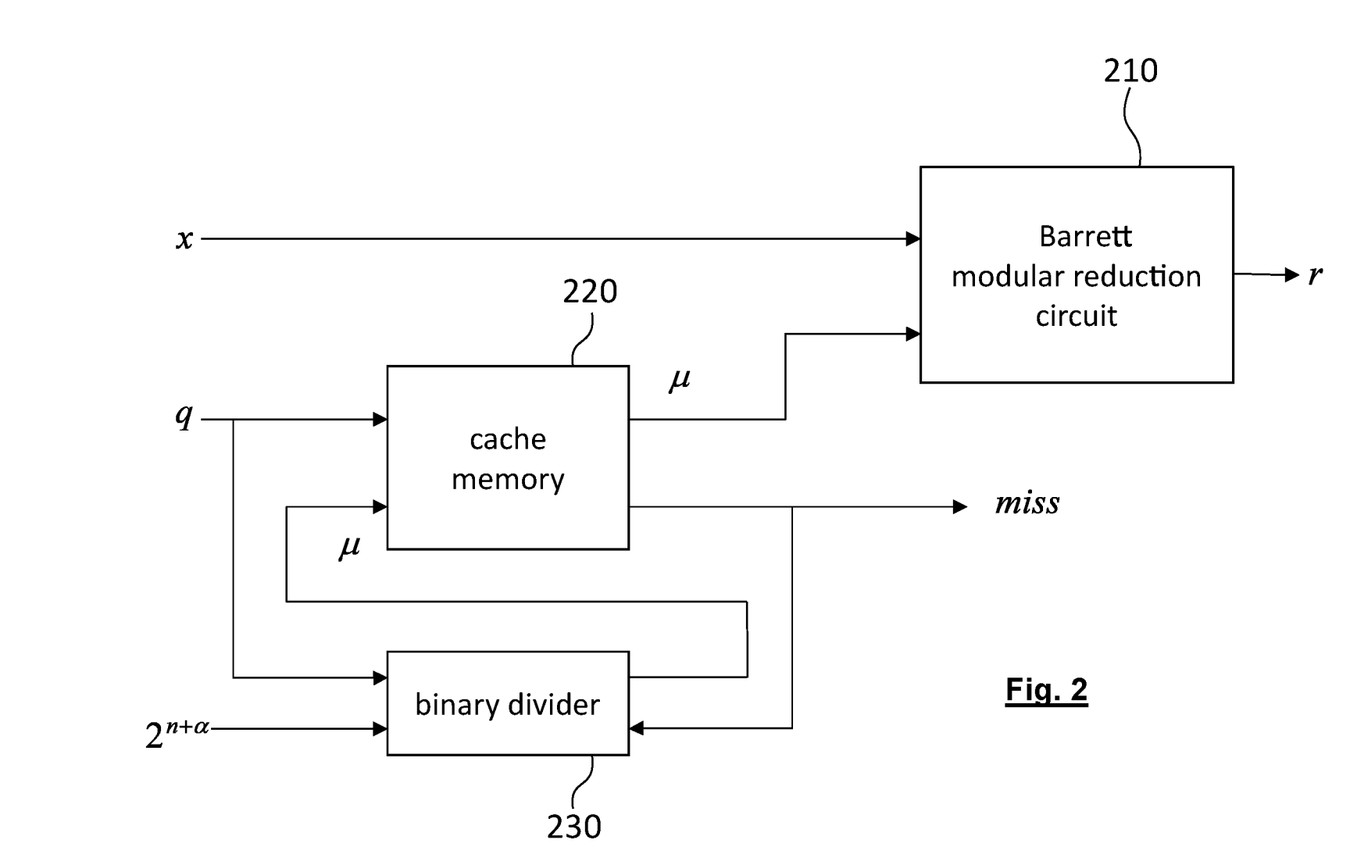
FIG. 2 represents the architecture of a modular reduction device according to a first embodiment of the invention.

FIG. 2 represents the architecture of a modular reduction device according to a first embodiment of the invention.

It comprises a modular reduction circuit implementing the generalised Barrett algorithm 210, the structure of which has been described with reference to FIG. 1, a cache memory 220 that will contain recent values of $$\mu(q) = \left\lfloor \frac{2^{n+\alpha}}{q} \right\rfloor$$

and a binary division circuit, 230.

The Barrett modular reduction circuit, 210, receives firstly the value x for which the modular reduction is to be made, and secondly the value of the coefficient $\mu$ read in the cache memory, 220. It provides the modular remainder r as output, as described above.

The cache memory 220 is addressed in read by modulo q. If the value $$\mu(q) = \left\lfloor \frac{2^{n+\alpha}}{q} \right\rfloor$$

is present in the cache memory (miss=0) it is provided directly to the Barrett modular reduction circuit. On the other hand, if the value $\mu(q)$ is not present in the cache memory, a control signal (miss=1) triggers the calculation of $\mu(q)$ by the binary division circuit 230. This binary division circuit receives firstly the modulo q and secondly $2^{n+\alpha}$, or even simply the value $\alpha$, the binary word corresponding to $2^{n+\alpha}$ ($n+\alpha+1^{\text{ème}}$ high order bits equal to "1" and other bits equal to zero) being generated simply at the input to the binary division circuit.

The binary division circuit calculates the quotient $$\left\lfloor \frac{2^{n+\alpha}}{q} \right\rfloor$$

and supplies it to the cache memory to be stored in relation to the modulo q.

It can thus be understood that either the value of $\mu(q)$ is already present in the cache memory and is then input directly to the Barrett modular reduction circuit, or it is not present in the memory in question and the binary division circuit makes a precalculation of $\mu(q)$. This thus avoids systematically making the precalculation of $\mu(q)$, and therefore the latency of the device is reduced under steady-state conditions.

The binary division circuit 230 advantageously implements a division algorithm without restoring the dividend. For example, a description of this algorithm is given in the book by J-P Deschamps, entitled "Hardware implementation of finite-field arithmetic", McGraw-Hill, Inc., NY, USA, 2009.

The cache memory 220 is preferably a fast memory and is closely integrated with the calculation software (for example of the SRAM type) and is small (typically a few kb up to about 10 Mb). Advantageously, its size can be configured depending on the required latency time.

Figure 3:
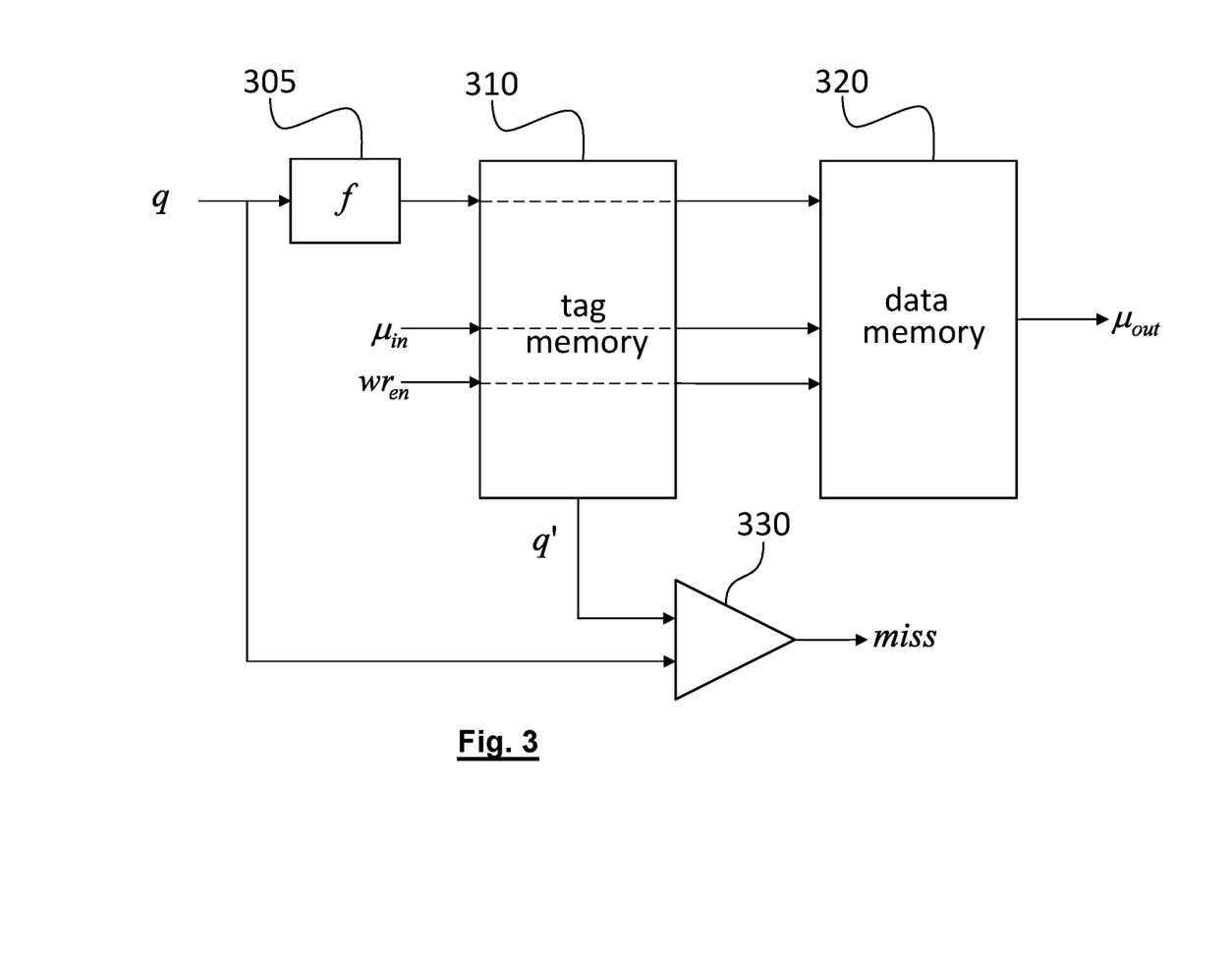
FIG. 3 diagrammatically represents the structure of a cache memory used in the device in FIG. 2.

The structure of the cache memory 220 is illustrated in FIG. 3. It comprises a first part called the tag memory, 310 and a second part called the data memory, 320.

The cache memory has three inputs q, $\mu_m$ and $wr_{en}$. The q input receives the value of the modulo, in other words the divider used for the operation. The $\mu_{in}$ input receives the value μ associated with q when the cache memory is in write ($wr_{en}$=1) and $wr_{en}$ is a bit indicating if the memory is in write and more precisely if the value μ(q) associated with q in the data memory has to be replaced.

The cache memory also has two outputs, $μ_{out}$ and miss. The output $μ_{out}$ supplies the value μ(q) associated with $f(q)$, stored in the data memory in which $f$ is a subjective function explained below, and the bit miss indicates if the right value μ(q) is actually in the cache. In the case in which this value is not present in the data memory, the output $μ_{out}$ provides an incorrect value μ(q') (satisfying $f(q')=f(q)$) and the miss bit is equal to the value 1.

The projection function $f$ is a subjective function of $\{0,1\}^n$ in $\{0,1\}^m$ with m<n making a condensate $f(q)$ (on m bits) correspond to each value of q (on n bits). One example of function $f$ is the truncation of n−q low order bits of q but alternatively other functions can be chosen.

The tag memory is addressed by $f(q)$ and contains the value of the modulus (the tag) q that was used to generate it, at this address. The data memory is also addressed by $f(q)$ and contains the value μ(q) for the value q associated with $f(q)$ in the tag memory.

It can thus be understood that the size of the cache memory is $2^{m+1}$ (size $2^m$ for the tag memory and $2^m$ for the data memory). The tag memory enables discrimination in the case of collision. When it is required to obtain the value μ(q) for a given modulo value q, the condensate $f(q)$ is calculated in 305 and the tag (denoted q') stored at address $f(q)$ is read ($w_{ren}$=0) in the tag memory. The comparator 330 at the output from the tag memory compares if q is equal to the tag q'. If it is not, there is a collision, in other words we have q≠q' in which $f(q)=f(q')$ and the miss bit indicates this (miss=1). Once the value of μ(q) has been calculated by the binary division circuit, the cache memory goes into write mode ($w_{ren}$=1), the tag q is stored at address $f(q)$ in the tag memory and the value μ(q) thus calculated is stored at address q in the data memory.

On the other hand, if q=q', the value stored in the data memory in relation to $f(q)$ is actually the correct value μ(q) and the miss bit also indicates this (miss=0).

Cooperation of the cache memory with the Barrett modular reduction circuit can optimise the calculation time. When the cache memory contains the value μ(q) of the modulo present at the input, the modular reduction is made optimally, in only a few cycles. On the other hand, if it does not contain it, the value μ(q) is calculated by the binary division circuit, which requires several calculation cycles. Considering that a modular multiplication or exponentiation operation uses the same modulo a large number of consecutive times, the average total calculation time is significantly shorter than that observed in the state of the art under the same conditions.

Figure 4:
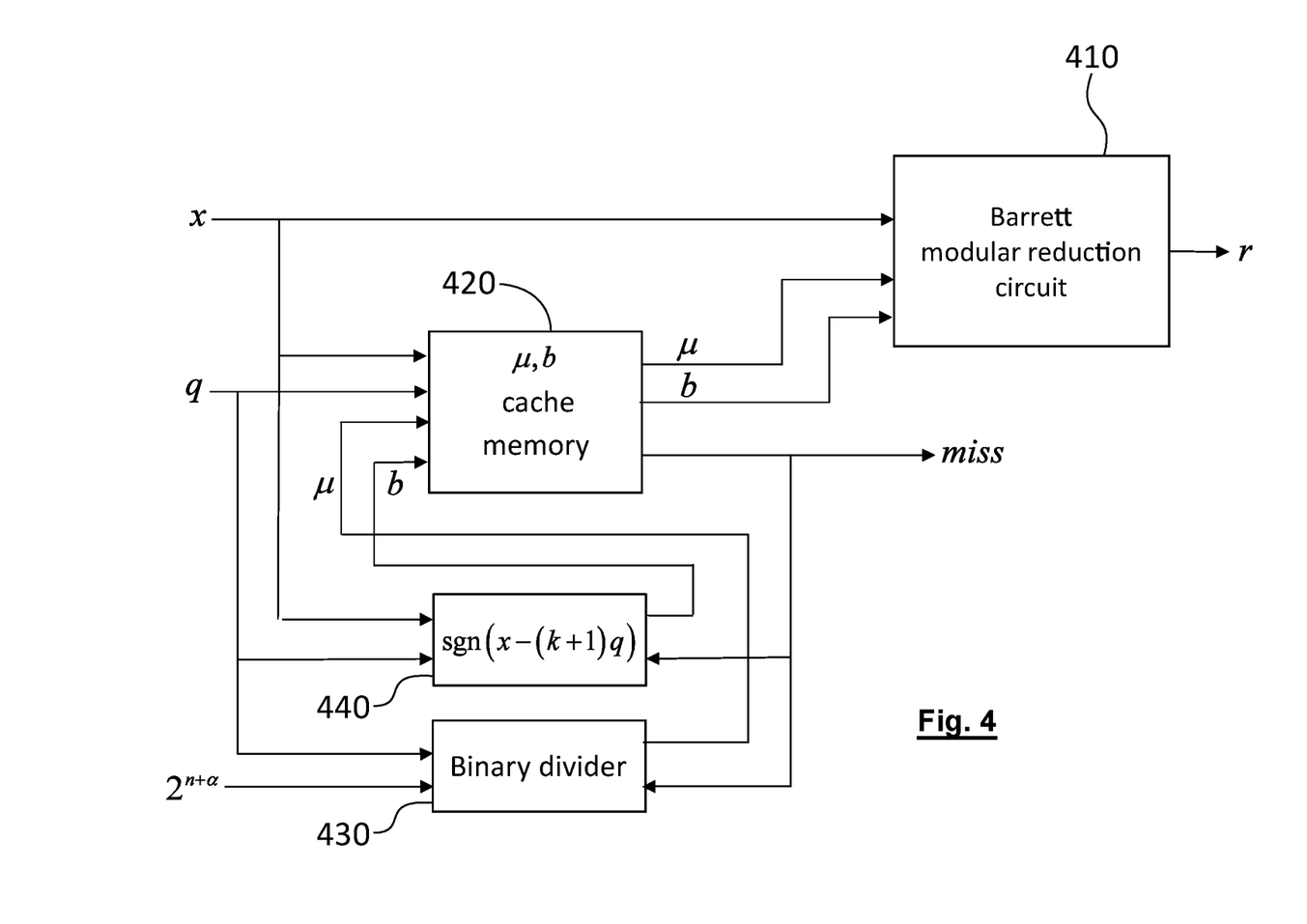
FIG. 4 represents the architecture of a modular reduction device according to a second embodiment of the invention.

FIG. 4 diagrammatically represents the architecture of a modular reduction device according to a second embodiment of the invention.

This second embodiment is different from the first, firstly in that it contains a simplified Barrett (modular reduction) circuit, 410, as described below, and secondly in that in addition to receiving the value of the modulo, q, the cache memory 420 also receives the value x for which it is required to make the modular reduction.

The value x and the values μ,b read in the cache memory are input to the simplified Barrett circuit 410 that uses them to deduce the modular remainder r.

Figure 5:
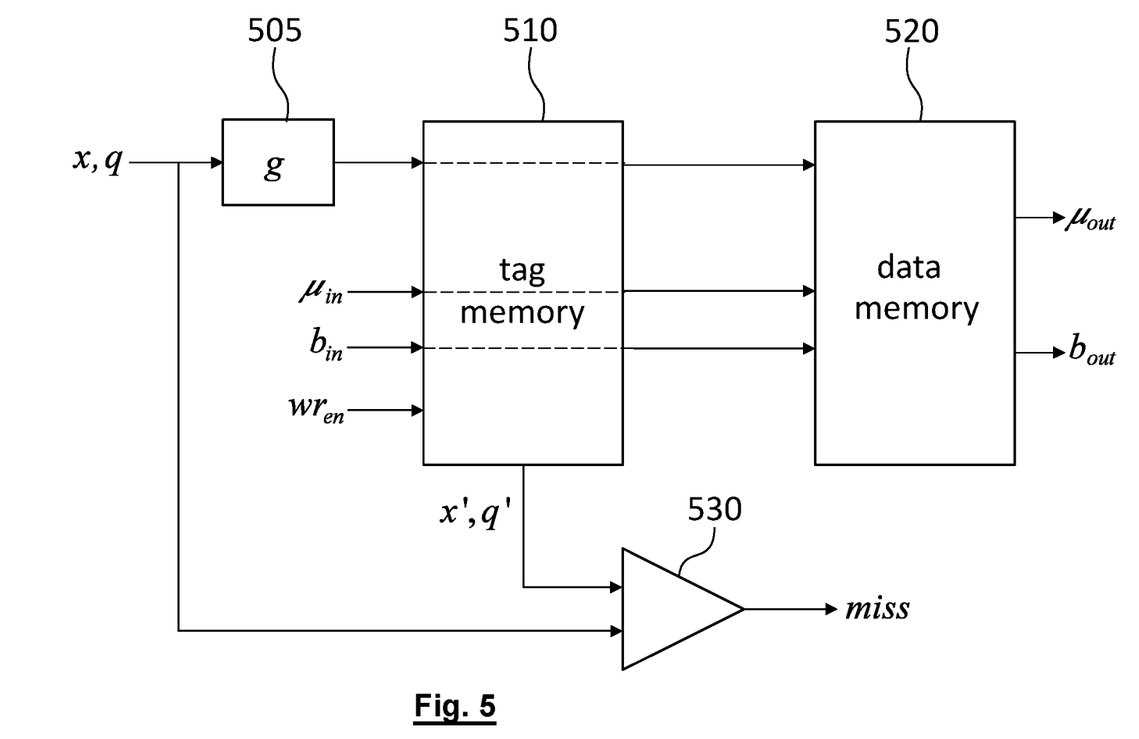
FIG. 5 diagrammatically represents the structure of a cache memory used in the device in FIG. 4.

The architecture of the cache memory 420 is illustrated in FIG. 5.

The tag memory 510 is addressed by g(x,q) calculated in 505, in which g is a subjective function of $\{0,1\}^{2n} \times \{0,1\}^n$ in $\{0,1\}^m$ with m<3n associating a condensate on m bits with each (x,q) pair. For example, the function g can concatenate the m−η MSB bits of x, 0<η<m with the η MSB bits of q to form the condensate, but obviously other projection functions can be chosen alternatively. Preferably, we will choose η=m−1, in other words only the MSB of x will be used in the condensate. In all cases, the tag memory supplies the tag stored at address g(x,q).

The data memory 520 is also addressed by g(x,q) and when the tag (x', q') is the right tag, in other words when (x', q')=(x,q), supplies not only the value μ(q) on the output $μ_{out}$ but also the sign b(x,q)=x−(k+1)q on the output $b_{out}$ in which k is given by the expression (3). In this case, we use the convention $b_{out}$=0 if the result is positive and $b_{out}$=1 if it is negative. Comparator 530 compares x,q with x',q'.

When the tag is not present in the tag memory 510, the value μ(q) is obtained by the binary division circuit 430 and the sign b(x,q)=x−(k+1)q is deduced from it in the sign calculation circuit 440. The (x,q) pair is then stored at address g(x,q) in the tag memory and the (μ(q), b(x,q)) pair of previously calculated values is stored at address g(x,q) in the data memory.

Figure 6:
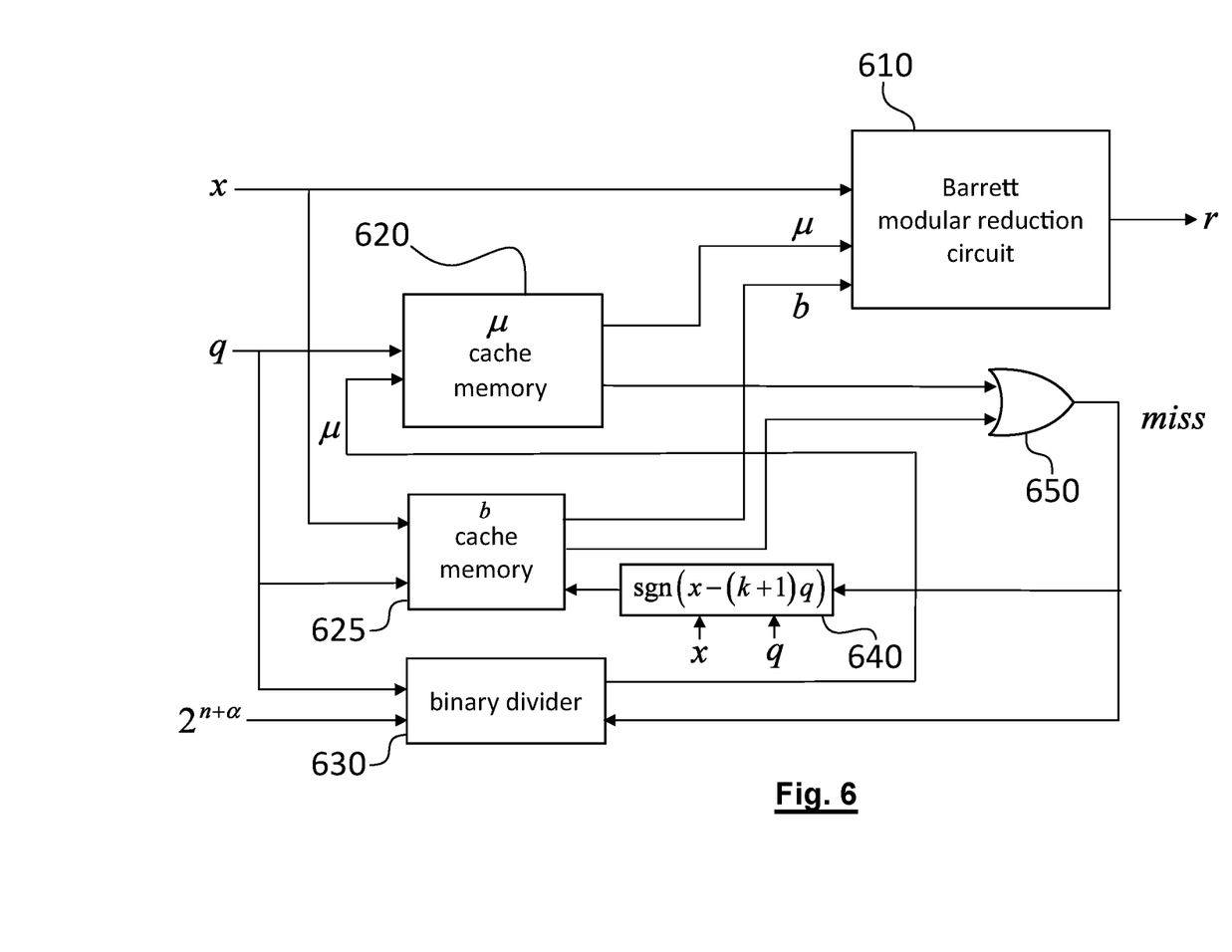
FIG. 6 represents the architecture of a modular reduction device according to a variant of the second embodiment of the invention.

FIG. 6 represents the architecture of a modular reduction device according to a first variant of the second embodiment of the invention.

This variant is different from that represented in FIG. 4 in that it comprises two independent cache memories, one for values of the coefficient μ, 620, and another for values of the sign b, 625.

The first cache memory 620 operates essentially like the cache memory 220. It receives the value of the modulo, q, as input. When the label q is present in the cache tag memory, the value μ(q) stored in the data memory at address $f(q)$ is supplied directly to the simplified Barrett (modular reduction) circuit, 610. If it is not (miss=1), the value of μ(q) is calculated from modulo q and the binary constant $2^{n+α}$ is calculated by the binary division circuit 630, identical to the circuit 230 and advantageously implementing a non-restoring division algorithm. The value of μ(q) thus calculated is stored in the data memory at address $f(q)$.

The second cache memory 625 receives the value x and the value of the modulo q as input. When the (x,q) pair is stored at address h(x,q) in the tag memory in which h is the projection function in the cache, the sign value b(x,q) is read in the data memory and input to the simplified Barrett circuit 610. If it is not, the sign value b(x,q) is calculated by the sign calculation circuit, 640, from x,q: b(x,q)=sgn(x−(k+1)q) in which k is calculated using expression (3). If necessary, the sign calculation circuit can also receive the value μ(q), when it has been validated, so as to reduce the latency when the value μ(q) is present in the cache 620 but the sign b(x,q) is not present in the cache 625. The sign value stored at address h(x,q) is updated (in other words inverted) when the tag verification at address h(x,q) fails.

In the variant illustrated, μ(q) and b(x,q) are calculated when one of the two is not located in the corresponding cache, the failure signal (miss=1) being generated by the OR logic gate, 650.

In the case of the second embodiment (FIG. 4) and its first variant (FIG. 6), it was assumed that each cache memory contained a tag memory to resolve collisions and a data memory to find relevant information (coefficient μ and/or sign b) in the absence of collision. However in a second variant, it would be possible to not use the tag memory (and therefore collision detection) in that the (u',b') pair, even though incorrect, leads (incidentally) to a modular residue 0≤x−(k'−b')q<q in which k' is obtained from μ' according to expression (3). The uniqueness of the result of the Euclidean division ensures that the modular residue is then correct. Nevertheless, correct values μ(q) and/or b(x,q) can be calculated to update the data memory at the corresponding address. This update can also be made after the value of the modular residue has been supplied at the output, without penalising the latency.

Figure 7:
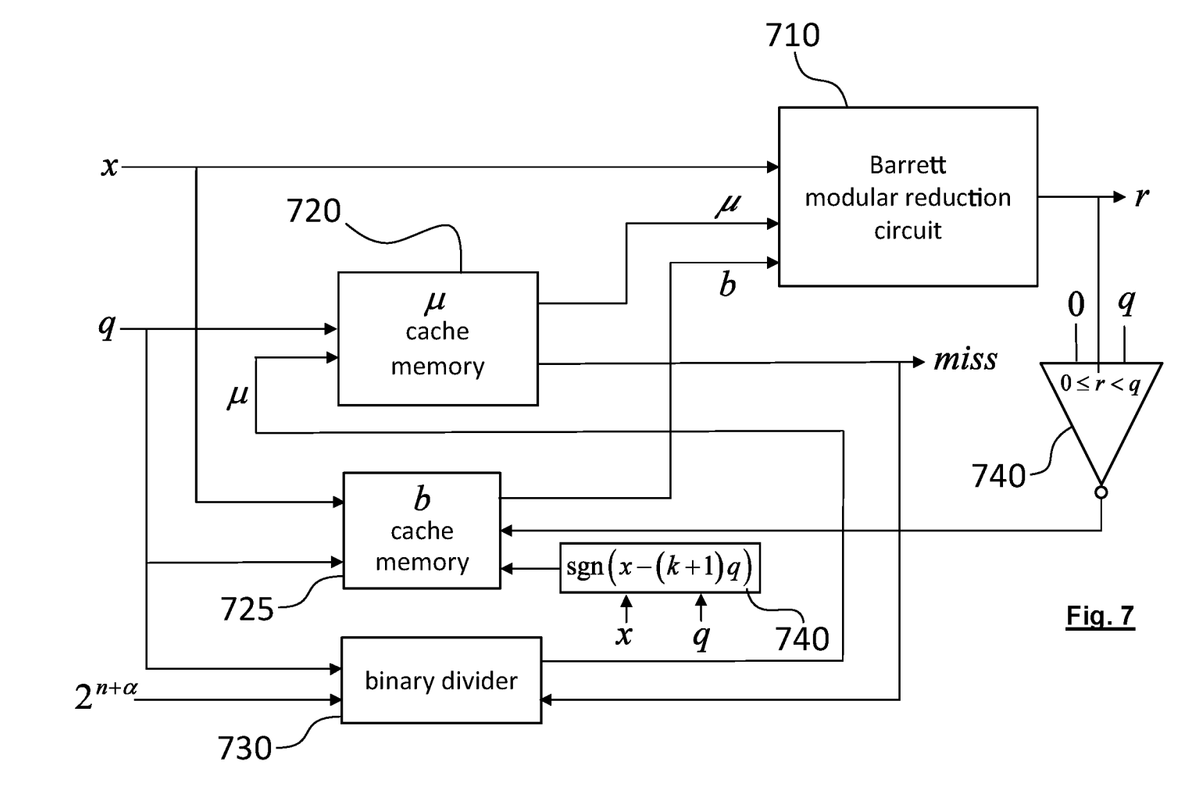
FIG. 7 represents the architecture of a modular reduction device according to a second variant of the second embodiment of the invention.

FIG. 7 represents the architecture of a modular reduction device according to a second variant of the second embodiment of the invention.

Elements 710 to 740 are identical or similar to the corresponding elements 610 to 640. However in this second variant, the cache memory b, 725, does not contain a tag memory. The cache memory 725 is updated when the output value from the Barrett circuit 710 does not satisfy the 0≤r<q condition, determined by the comparator 750.

The modular reduction using the device according to the second embodiment (FIG. 4 and FIGS. 6-7) is faster than in the first embodiment (FIG. 2). As will be seen later, the simplified Barrett circuit (410,610,710) is shallower than the Barrett circuit 110 in FIG. 1. Furthermore, the separation of the cache into two independent caches provides greater freedom in the choice of projection functions $f$ and h. In the case of operation without a tag memory (FIG. 7) for the sign cache memory (FIG. 7), there is a high probability that the correct value of b is stored in the cache 725 at address h(q,x). This sign value is validated by the comparator 750. Therefore the combined memory size of caches 720 and 725 is generally smaller than the size of the memory cache 420.

Figure 8:
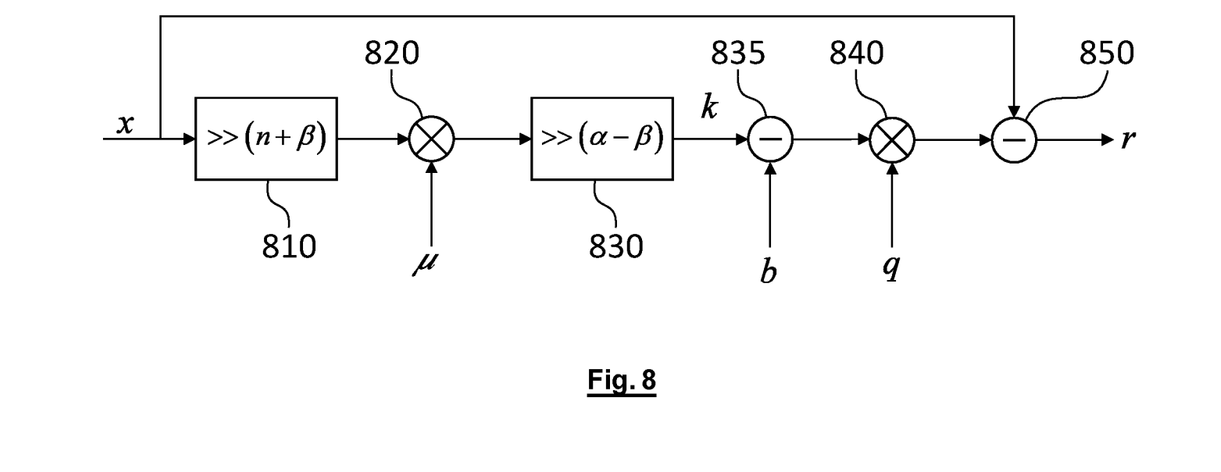
FIG. 8 diagrammatically represents a simplified Barrett modular reduction circuit used in the device in FIG. 4 or the device in FIGS. 6 and 7.

FIG. 8 diagrammatically represents the simplified Barrett circuit in 410 on FIG. 4, 610 on FIGS. 6 and 710 on FIG. 7.

Elements 810-850 are identical to elements 110-150 respectively in the Barrett circuit represented on FIG. 1, and they will not described again herein.

Unlike the circuit in FIG. 1, the value b, in other words the sign read in the cache memory, is subtracted from k at 835 to provide the modular remainder directly:

$$r=x-(k-b)q \quad (5)$$

As mentioned above, this invention can reduce the average calculation time spent for a modular reduction. Furthermore, since the hardware footprint of the Barrett circuit and the binary division circuit is very small, the circuit corresponding to the entire modular reduction circuit is also very small. Finally, the size of the cache memory can be configured. For example, if the modular reduction device is implemented using an FPGA, a large cache memory can be envisaged. On the other hand, for an implementation using an ASIC circuit, a small cache memory, for example composed of only a few registers, might be preferred.

The invention claimed is:

1. A modular reduction device to calculate the remainder of an integer x divided by a modulo (q), said integer being represented by a binary word of 2n bits and the modulo (q) by a binary word of n bits, comprising:
   a circuit configured to implement a generalised Barrett reduction algorithm, called a Barrett circuit,
   a cache memory, and
   a binary division circuit, the Barrett circuit receiving said integer and a result of a precalculation (μ) relative to a value of the modulo (q) and a power of 2 ($2^{n+\alpha}$), the result of the precalculation (μ) being supplied directly by the cache memory to the Barrett circuit if it is already stored relative to said value of the modulo (q), and otherwise being calculated by the binary division circuit before being stored in the cache memory and input to the Barrett circuit,
   wherein the cache memory comprises a first part called a tag memory, and a second part called a data memory, the first and second parts being addressed by $f(q)$ wherein $f$ is a projection function of n bits on m bits with m<n, the first part storing a tag value q' that was used to calculate $f(q')$ at address $f(q')$, and the second part storing said result of the precalculation (μ(q')) at the same address.

2. The modular reduction device according to claim 1, wherein the binary division circuit performs the precalculation $$\mu = \left\lfloor \frac{2^{n+\alpha}}{q} \right\rfloor$$

wherein $$\left\lfloor \frac{2^{n+\alpha}}{q} \right\rfloor$$

is the largest integer smaller than or equal to $$\frac{2^{n+\alpha}}{q}$$

wherein $2^{n+\alpha}$ is said power of 2 and α is an integer such that α≥n+1.

3. The modular reduction device according to claim 2, wherein the Barrett circuit shifts the binary word representing x by α+β bits towards the low order bits, in which β is an integer such that β≥−2, then multiplies the binary word representing x thus shifted by the result of the precalculation (μ), then shifts the result of this multiplication again by α−β bits towards the low order bits to obtain a second word, said second word being multiplied by the modulo (q) before being subtracted from the binary word representing x to supply a provisional value r' of a remainder r, a value of the remainder r being chosen equal to r' if r'−q is negative or zero and equal to r'−q if r'−q is positive.

4. The modular reduction device according to claim 1, wherein the cache memory also receives the integer x and also provides the result of the precalculation (μ) for a value of the modulo (q), a sign value associated with an (x,q) pair, this sign value being input to the Barrett circuit.

5. The modular reduction device according to claim 4, wherein the binary division circuit performs a precalculation $$\mu = \left\lfloor \frac{2^{n+\alpha}}{q} \right\rfloor$$

wherein $$\left\lfloor \frac{2^{n+\alpha}}{q} \right\rfloor$$

is a largest integer smaller than or equal to $$\frac{2^{n+\alpha}}{q}$$

wherein $2^{n+\alpha}$ is said power of 2 and $\alpha$ is an integer such that $\alpha \geq n+1$.

6. The modular reduction device according to claim 5, wherein the Barrett circuit shifts the binary word representing x by $\alpha+\beta$ bits towards the low order bits, wherein $\beta$ is an integer such that $\beta \geq -2$, then multiplies the binary word representing x thus shifted by the result of the precalculation ($\mu$), then shifts the result of this multiplication by another $\alpha-\beta$ bits towards the low order bits to obtain a second word, the sign value b being subtracted from the second word before it is multiplied by the modulo (q), the result of this multiplication then being subtracted from the integer x to give said remainder r.

7. The modular reduction device according to claim 1, comprising a second cache memory receiving the integer x and the modulo (q) and outputting a sign value b stored at an address in relation to an (x,q) pair, the sign value b being input to the Barrett circuit.

8. The modular reduction device according to claim 7, wherein the second cache memory comprises a second tag memory and a second data memory, the second tag and second data memories both being addressed by h (x,q) wherein h is a projection function of 3n bits onto m bits in which m<3n, the second tag memory storing a tag value (x',q') used to calculate h(x',q') at address h(x',q'), and the second data memory storing said sign value (b (x',q')) associated with the tag value (x',q'), at the same address h(x',q').

9. The modular reduction device according to claim 8, wherein the sign value is b provided directly by the second cache memory to the Barrett circuit if the modulo value (q) is stored in the tag memory and the (x,q) pair is stored in the second tag memory, and otherwise the sign value b is obtained from the modulo value (q) and the integer x, the sign value b then being input to the Barrett circuit.

10. The modular reduction device according to claim 7, wherein the second cache memory comprises a second data memory but does not comprise a tag memory, and the device comprises a comparator to verify if an output r from the Barrett circuit satisfies a condition $0 \leq r < q$ and that a sign value thus obtained (b (x,q)) is stored in the second data memory at address h (x,q) in relation to the (x,q) pair, wherein h is a projection function of 3n bits onto m bits wherein m<3n, is inverted if said condition is not satisfied.

11. A modular reduction device to calculate the remainder of an integer x divided by a modulo (q), said integer being represented by a binary word of 2n bits and the modulo (q) by a binary word of n bits, comprising:
  a circuit configured to implement a generalised Barrett reduction algorithm, called a Barrett circuit,
  a cache memory, and
  a binary division circuit, the Barrett circuit receiving said integer and a result of a precalculation ($\mu$) relative to a value of the modulo (q) and a power of 2 ($2^{n+\alpha}$), the result of the precalculation ($\mu$) being supplied directly by the cache memory to the Barrett circuit if it is already stored relative to said value of the modulo (q), and otherwise being calculated by the binary division circuit before being stored in the cache memory and input to the Barrett circuit,
  wherein
  the cache memory also receives the integer x and also provides the result of the precalculation ($\mu$) for a value of the modulo (q), a sign value associated with an (x,q) pair, this sign value being input to the Barrett circuit, and
  the cache memory comprises a first part called a tag memory, and a second part called a data memory, the first and second parts being addressed by g (x,q) wherein g is a projection function of 3n bits onto m bits with m<3n, the tag memory storing a tag value (x', q') that was used to calculate g (x', q') at address g (x', q') and the data memory storing said result of the precalculation ($\mu$(q')) and a sign value (b (x', q')) associated with the tag value (x', q'), at the same address g (x', q').

12. The modular reduction device according to claim 11, wherein the result of the precalculation ($\mu$) and the sign value b are supplied directly by the cache memory to the Barrett circuit if an (x,q) pair is stored in the tag memory, and otherwise the result of the precalculation ($\mu$) is obtained by the binary division circuit from the value of the modulo (q) and the power of 2, the sign value b, being obtained from the value of the modulo (q), the integer x, and the result of the precalculation ($\mu$), the result of the precalculation ($\mu$) and the sign value b being stored in the data memory at the address to be calculated g (x,q) before being input to the Barrett circuit.

* * * * *